United States Patent
Sprangle et al.

(10) Patent No.: US 8,665,923 B2
(45) Date of Patent: Mar. 4, 2014

(54) REMOTELY INDUCED ATMOSPHERIC LASING

(75) Inventors: Phillip A. Sprangle, Great Falls, VA (US); Joseph R. Penano, Fairfax Station, VA (US); Marlan O. Scully, Bryan, TX (US); Daniel F. Gordon, Waldorf, MD (US); Bahman Hafizi, Bethesda, MD (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 124 days.

(21) Appl. No.: 13/334,172

(22) Filed: Dec. 22, 2011

(65) Prior Publication Data
US 2012/0170599 A1 Jul. 5, 2012

Related U.S. Application Data

(60) Provisional application No. 61/427,812, filed on Dec. 29, 2010.

(51) Int. Cl.
*H01S 3/091* (2006.01)

(52) U.S. Cl.
USPC .................................. 372/70; 372/5; 372/55

(58) Field of Classification Search
USPC ................................................ 372/5, 55, 70
See application file for complete search history.

(56) References Cited

PUBLICATIONS

Sprangle et al., "Remote Atmospheric Lasing," Sep. 24, 2010, NRL/MR/6790-10-9284, 1-10.*
Popov, "Tunnel and Multiphoton Ionization of Atoms and Ions in a Strong Laser Field (Keldysh Theory)," 2004, Physics—Uspekhi 47, 9, 855-885.*
Xu et al., "The Mechanism of Nitrogen Fluorescence Inside a Femtosecond Laser Filament in Air," May 6, 2009, Chemical Physics 360, 171-175.*
Kartashov et al., "Free-Space Nitrogen Gas Laser Driven by a Femtosecond Filament," Sep. 24, 2012, Physical Review A, 86, 033831, 1-8.*
Tzortzakis et al., "Femtosecond and Picosecond Ultraviolet Laser Filaments in Air: Experiments and Simulations," Sep. 15, 2001, Optics Communications, 197, 131-143.*
Vaulin et al., "Air Ultraviolet Laser Excited by High-Power Microwave Pulses," Nov. 1988, Sov. J. Quantum Electron., 18, 11, 1457-1458.*
R. S. Kunabenchi, M. R. Gorbal and M. I. Savadatti, "Nitrogen Lasers," Prog. Quant. Electr. 9, 259 (1984).

(Continued)

*Primary Examiner* — Jessica Stultz
*Assistant Examiner* — Joshua King
(74) *Attorney, Agent, or Firm* — US Naval Research Laboratory; Joslyn Barritt

(57) ABSTRACT

A laser pulse from an ultrashort pulse laser (USPL) is fired into the atmosphere. The USPL pulse is configured to generate a plasma filament at a predefined target in the atmosphere, in which free, or "seed," electrons are generated by multiphoton or tunneling ionization of the air molecules in the filament. A second pulse is fired into the atmosphere to form a heater beam that impinges on the plasma filament and thermalizes the seed electrons within the plasma filament, leading to the collisional excitation of the electrons in the filament. The excited electrons collisionally excite various electronic and vibrational states of the air molecules in the filament, causing population inversions and lasing, e.g., exciting the $C^3\Pi_u \rightarrow B^3\Pi_g(v=0\rightarrow 0)$ transition of the $N_2$ in the atmosphere to cause lasing at 337 nm.

14 Claims, 10 Drawing Sheets

(56) References Cited

PUBLICATIONS

E.T. Gerry, "Pulsed-Molecular-Nitrogen Laser Theory," Appl. Phys. Lett. 7, 6 (1965).

G.G. Petrash, "Pulsed Gas-Discharge Lasers," Soviet Physics Uspekhi 14, 747 (1972).

A.W. Ali, A.C. Kolb and A.D. Anderson, "Theory of the Pulsed Molecular Nitrogen Laser," Appl. Opt. 6, 2115 (1967).

R.T. Brown, "Kinetic processes in a laser-heated helium-nitrogen plasma for use as a uv laser medium," J. Appl. Phys. 46, 4767 (1975).

W.A. Fitzsimmons, L.W. Anderson, C.E. Riedhauser and J.M. Vrtilek, "Experimental and Theoretical Investigation of the Nitrogen Laser," IEEE J. Quantum Electron. QE-12, 624 (1976).

V.S. Antonov, I.N. Knyazev, and V.G. Movshev, "Output radiation of an ultraviolet nitrogen laser excited transversely in an open air cell," Soviet Journal of Quantum Electronics 4, 246 (1974).

V. Kocharovsky, S. Caemron, K. Lehmann, R. Lucht, R. Miles, Y. Rostovtsev, W. Warren, G.R. Welch and M.O. Scully, "Gain-swept superradiance applied to the stand-off detection of trace impurities in the atmosphere," Proc. Nat. Acad. Sci. 102, 7806 (2005).

Q. Luo, W. Liu and S.L. Chin, "Lasing action in air induced by ultrafast laser filamentation," Appl. Phys. B 76, 337 (2003).

A. Couairon and A. Mysyrowicz, "Femtosecond filamentation in transparent media," Phys. Reports 441, 47 (2007).

P. Sprangle, J. R. Periano, and B. Hafizi, "Propagation of Intense Short Laser Pulses in the Atmosphere," Phys. Rev. E 66, 046418 (2002).

H.L. Xu, A. Azarm, J. Bernhardt, Y. Kamali, S.L. Chin, "The mechanism of nitrogen fluorescence inside a femtosecond laser filament in air," Chem. Phys. 360, 171 (2009).

H. Bohringer and F. Arnold, "Temperature dependence of three-body association reactions from 45 to 400 K . . . ", J. Chem. Phys. 77, 5534 (1982).

M. Fitaire, "Measurement of N+4 recombination rate vs. electron temperature in a proton beam created plasma," J. Chem. Phys. 81, 1753 (1984).

F.J. Mehr and M.A. Biondi, "Electron Temperature Dependence of Recombination of O+2 and N+2 Ions with Electrons," Phys. Rev. 181, 264 (1969).

R.F. Fernsler, A.W. Ali, J.R. Greig and I.M. Vitkovitsky, "The NRL CHMAIR Code: A Disturbed Sea Level Air Chemistry Code," NRL Memorandum Report 4110 (1979).

P. Sprangle, J. Periano, B. Hafizi, D. Gordon, and M. Scully entitled "Remotely induced atmospheric lasing," Appl. Phys. Lett. 98, 211102 (2011).

J. R. Peñano, P. Sprangle, B. Hafizi, A. Ting, D. F. Gordon, and C. A. Kapetanakos, "Propagation of ultra-short, intense laser pulses in air," Phys. Plasmas 11, 2865 (2004).

A. Ting, I. Alexeev, D. Gordon, E. Briscoe, J. Penano, R. Fischer, R. Hubbard, P. Sprangle and G. Rubel, "Remote atmospheric breakdown for standoff detection by using an intense short laser pulse," Applied Optics, 44, 5315 (2005).

P. Sprangle, A. Ting, J. Peñano, R. Fischer, B. Hafizi, "Incoherent Combining and Atmospheric Propagation of High-Power Fiber Lasers for Directed-Energy Applications," IEEE Journal of Quantum Electronics 45, 138 (2009).

R.L. Fante, "Electromagnetic beam propagation in turbulent media," IEEE Proceedings., vol. 63, pp. 1669, 1975.

A.W. Ali, "Electron Energy Loss Rates in Air," NRL Memorandum Report 5400 (1984).

Tatsuo Tabata, Toshizo Shirai, Masao Sataka, and Hirotaka Kubo, "Analytic cross sections for electron impact collisions with nitrogen molecules," Atom. Dat. Nucl. Tab. 92, 3 (2006).

F. Valk, M. Aints, P. Paris, T. Plank, J. Maksimov, and A. Tamm, "Measurement of collisional quenching rate of nitrogen states . . . " J. Phys. D 43 385202 (2010).

H. Umemoto, "Selective production and kinetic analysis of thermally equilibrated . . . " Phys. Chem. Chem. Phys. 5, 5392 (2003).

J. Peñano, P. Sprangle, B. Hafizi, D. Gordon, R. Fernsler, and M. Scully, "Remote Lasing in Air by Recombination and Electron Impact Excitation of Molecular Nitrogen," to appear in Journal of Applied Optics (Jan. 2012).

A. Dogariu, J.B. Michael, M.O. Scully, R.B. Miles, "High Gain Backward Lasing in Air," Science 331, 442 (2011).

\* cited by examiner $C^3\Pi_u \rightarrow B^3\Pi_g \ (v=0 \rightarrow 0)$    337 nm
$C^3\Pi_u \rightarrow B^3\Pi_g \ (v=1 \rightarrow 0)$    315.8 nm
$C^3\Pi_u \rightarrow B^3\Pi_g \ (v=0 \rightarrow 2)$    380.4 nm

REMOTELY INDUCED ATMOSPHERIC LASING

CROSS-REFERENCE

This application claims the benefit of priority based on U.S. Provisional Patent Application No. 61/427,812 filed on Dec. 29, 2010, the entirety of which is hereby incorporated by reference into the present application.

TECHNICAL FIELD

The present invention relates to remote generation of laser pulses, particularly to remote generation of ultraviolet laser pulses in the atmosphere.

BACKGROUND

A laser is a device that emits coherent electromagnetic radiation by optical amplification based on stimulated emission of photons in a gain medium.

Lasers which utilize air as the gain medium have been extensively studied. See, e.g., R. S. Kunabenchi, M. R. Gorbal and M. I. Savadatti, "Nitrogen Lasers," *Prog. Quant. Electr.* 9, 259 (1984). Such lasers typically utilize electronic transitions in $N_2$ that emit UV radiation, such as the $C^3\Pi_u \rightarrow B^3\Pi_g$ (v=0→0) transition that lases at a wavelength of 337 nm.

Commercially available nitrogen lasers are typically based on collisional excitation of electrons using electrical discharges. See, e.g., E. T. Gerry, "Pulsed-Molecular-Nitrogen Laser Theory," *Appl. Phys. Lett.* 7, 6 (1965); G. G. Petrash, "Pulsed Gas-Discharge Lasers," *Soviet Physics Uspekhi* 14, 747 (1972); A. W. Ali, A. C. Kolb and A. D. Anderson, "Theory of the Pulsed Molecular Nitrogen Laser," *Appl. Opt.* 6, 2115 (1967); R. T. Brown, "Kinetic processes in a laser-heated helium-nitrogen plasma for use as a uv laser medium," *J. Appl. Phys.* 46, 4767 (1975); and W. A. Fitzsimmons, L. W. Anderson, C. E. Riedhauser and J. M. Vrtilek, "Experimental and Theoretical Investigation of the Nitrogen Laser," *IEEE J. Quantum Electron.* QE-12, 624 (1976).

Such lasers are typically run at low pressure to facilitate the acceleration of electrons to excitation energies. Nitrogen lasers at atmospheric pressure have also been constructed which require fast, nanosecond discharges. See V. S. Antonov, I. N. Knyazev, and V. G. Movshev, "Output radiation of an ultraviolet nitrogen laser excited transversely in an open air cell," *Soviet Journal of Quantum Electronics* 4, 246 (1974). The UV radiation produced by these lasers can be used to detect the presence of chemical and biological agents. However, the UV radiation does not propagate in the atmosphere over distances required for stand-off detection.

A remote UV generation scenario for biological and chemical detection has recently been proposed in which the air molecules are Raman or two-photon pumped to the appropriate excited state. See, e.g., V. Kocharovsky, S. Caemron, K. Lehmann, R. Lucht, R. Miles, Y. Rostovtsev, W. Warren, G. R. Welch and M. O. Scully, "Gain-swept superradiance applied to the stand-off detection of trace impurities in the atmosphere," *Proc. Nat. Acad. Sci.* 102, 7806 (2005).

In this scheme, the molecular excitations are achieved via simultaneous action of two synchronized picosecond laser pulses with a frequency difference or sum which is resonant with a transition from the ground state to a vibrationally excited state. Strong emission in the backward direction is generated via swept-gain superradiance. See V. Kocharovsky, supra.

In another work, backscattered fluorescence from $N_2$ molecules and ions has been observed in experiments in which a USPL-generated plasma filament was optically pumped. See, e.g., Q. Luo, W. Liu and S. L. Chin, "Lasing action in air induced by ultra-fast laser filamentation," *Appl. Phys. B* 76, 337 (2003).

SUMMARY

This summary is intended to introduce, in simplified form, a selection of concepts that are further described in the Detailed Description. This summary is not intended to identify key or essential features of the claimed subject matter, nor is it intended to be used as an aid in determining the scope of the claimed subject matter. Instead, it is merely presented as a brief overview of the subject matter described and claimed herein.

The present invention provides a new lasing scheme that can produce UV lasing in the atmosphere at kilometer distances.

In accordance with one embodiment of the present invention, a laser pulse from an ultrashort pulse laser (USPL) is fired into the atmosphere coincident with a longer, higher energy pulse. The pulse from the USPL is configured to generate a plasma filament at a predefined location in the atmosphere, in which free, or "seed," electrons are generated, for example, by multi-photon or tunneling ionization of the air molecules in the filament. The longer pulse functions as a heater beam that thermalizes the seed electrons within the plasma filament, leading to the collisional excitation of the electrons in the filament. The excited electrons collisionally excite various electronic and vibrational states of the air molecules in the filament, causing population inversions and lasing, e.g., exciting the $C^3\Pi_u \rightarrow B^3\Pi_g$(v=0→0) transition of the $N_2$ in the filament to cause UV lasing at 337 nm. The thus-produced UV radiation propagates in both the forward and backward directions along the plasma filament and has a gain sufficiently high to amplify the spontaneous radiation to saturation.

In another embodiment, molecular nitrogen in air can be excited without the use of a heater beam by recombination processes within the plasma filament. In this embodiment, a laser pulse from an USPL is fired into the atmosphere, the pulse from the USPL being configured to generate a plasma filament at a predefined location in the atmosphere, and being further configured to excite nitrogen molecules in the filament to produce an upper state populated by a three-body interaction of $N_2^+$, $N_2$ and $N_4^+$. The $N_4^+$ recombines with an electron to produce a nitrogen molecule in the excited $C^3\Pi_u$ state which then undergoes a relaxation transition to cause lasing at, e.g., 337 nm.

BRIEF DESCRIPTION OF THE DRAWINGS

FIGS. 8A and 6B are plots illustrating temporal profiles of UV intensity, normalized inversion density, and heater beam intensity (FIG. 8A) and corresponding profiles of electron temperature and electron density (FIG. 8B).

DETAILED DESCRIPTION

The aspects and features of the present invention summarized above can be embodied in various forms. The following description shows, by way of illustration, combinations and configurations in which the aspects and features can be put into practice. It is understood that the described aspects, features, and/or embodiments are merely examples, and that one skilled in the art may utilize other aspects, features, and/or embodiments or make structural and functional modifications without departing from the scope of the present disclosure.

For example, although the invention is described below in the context of a particular lasing transition, i.e., the 337 nm transition of $N_2$, it should be noted that other molecular transitions may also be excited by the method of the present invention, either in addition to or instead of the 337 nm $N_2$ transition, e.g., other vibrational states of $N_2$ as well as $N_2^+$ and $O_2$ molecular transitions, and that such other transitions may also result in lasing. Thus, the UV lasing spectrum produced in the atmosphere in accordance with the present invention may exhibit many of these lines.

The present invention provides a new lasing scheme that can produce ultraviolet (UV) radiation in the atmosphere at kilometer distances.

As described in more detail below, in accordance with one embodiment of the present invention, a laser pulse from an ultrashort pulse laser (USPL) is fired into the atmosphere coincident with a longer, higher energy pulse. The pulse from the USPL is configured to generate a plasma filament at a predefined location in the atmosphere, in which free, or "seed," electrons are generated, for example, by multi-photon or tunneling ionization of the air molecules in the filament. The longer pulse functions as a heater beam that thermalizes the seed electrons within the plasma filament, leading to the collisional excitation of the electrons in the filament. The excited electrons collisionally in turn excite various electronic and vibrational states of the $O_2$ and $N_2$ molecules within the filament, causing population inversions and lasing, e.g., exciting the $C^3\Pi_u \rightarrow B^3\Pi_g (v=0 \rightarrow 0)$ transition of the $N_2$ in the filament to cause UV lasing at 337 nm. The thus-produced UV radiation propagates in both the forward and backward directions along the plasma filament and has a gain sufficiently high to amplify the spontaneous radiation to saturation.

Figure 1A:
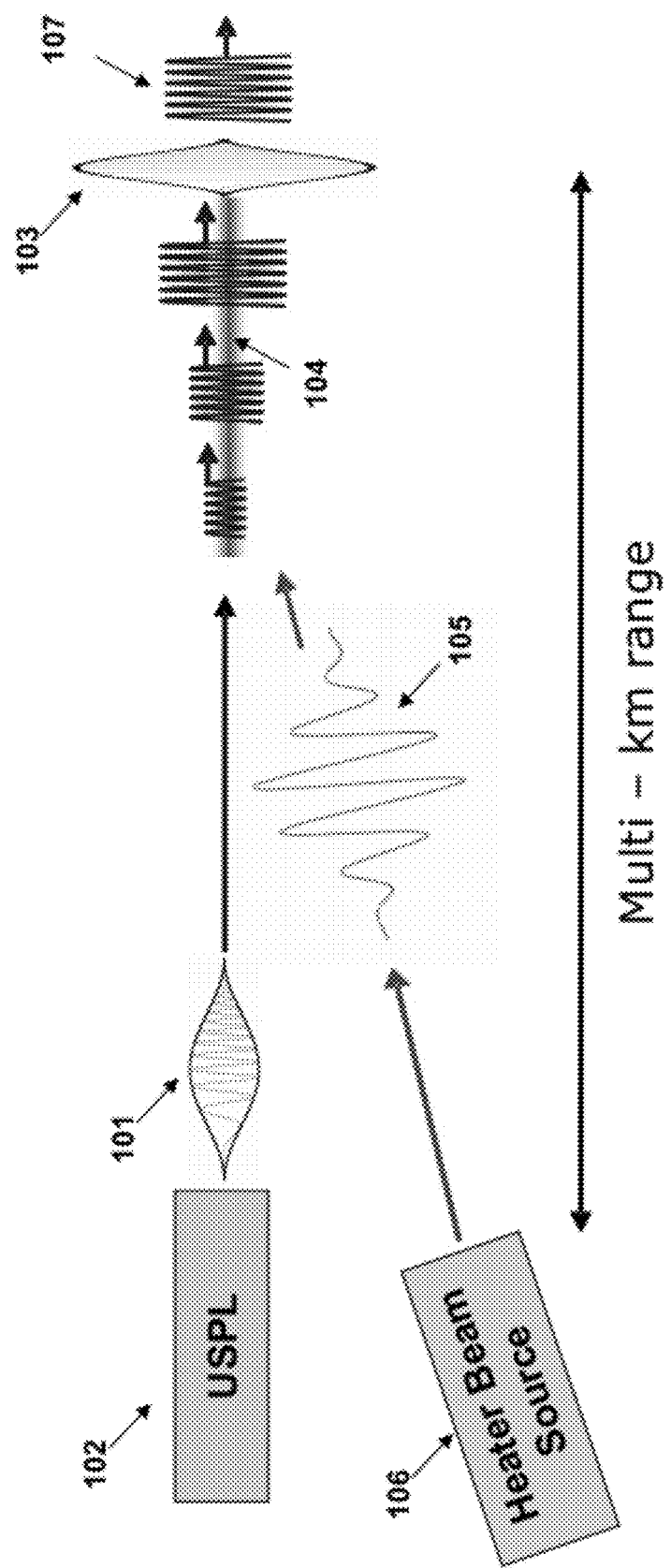
FIGS. 1A and 1B are schematic diagrams illustrating aspects of remote atmospheric lasing in accordance with the present invention.
Figure 1B:
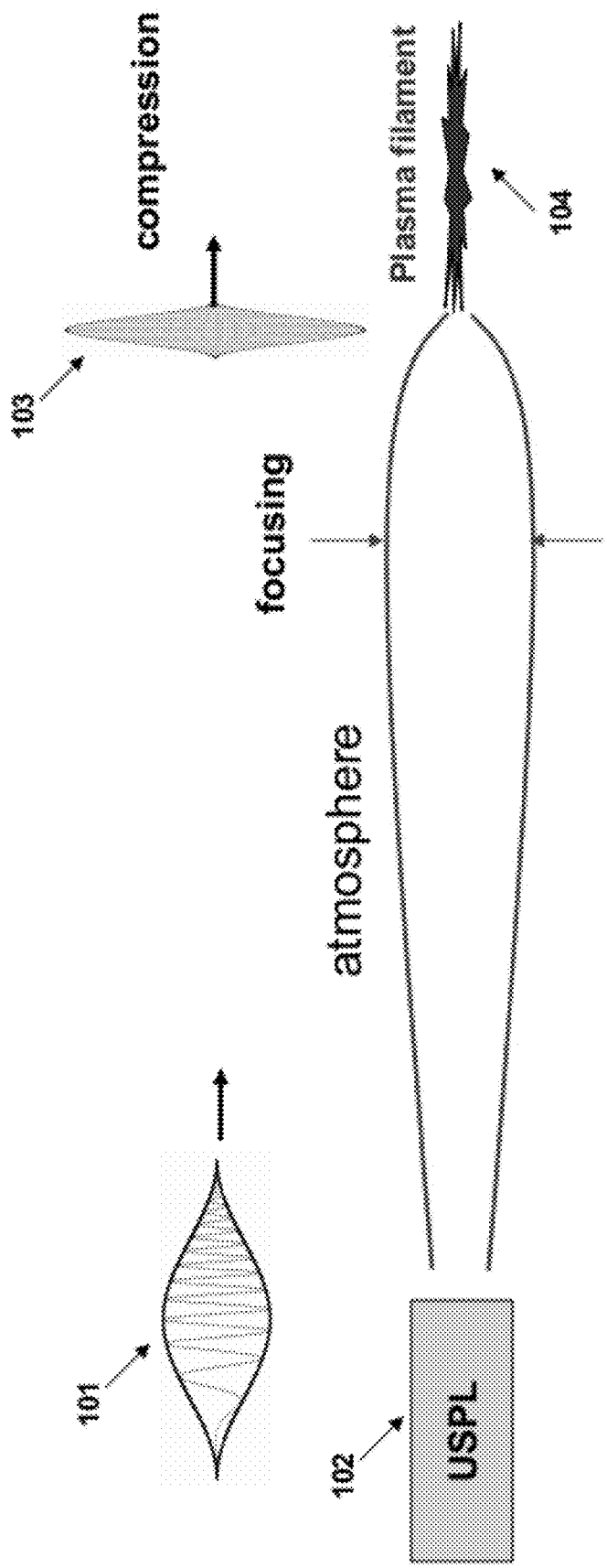

Aspects of this embodiment of remote atmospheric lasing in accordance with the present invention are illustrated in FIGS. 1A-1B.

In accordance with the present invention, as described in more detail below, remote lasing can be generated in the atmosphere by use of a laser pulse 101 generated by USPL 102 and heater beam 105 generated by Heater Beam Source 106 shown in FIG. 1.

As described in more detail below, the present invention provides remote atmospheric lasing based on collisionally exciting the $N_2$ lasing line at $\lambda=337$ nm in a heated plasma filament. Thermal electrons of a few eV can induce a population inversion in $N_2$ leading to the vibrational-electronic transition $C^3\Pi_u \rightarrow B^3\Pi_g(v=0 \rightarrow 0)$ at 337 nm, among others.

In accordance with the present invention, pulse 101 is fired into the atmosphere from USPL 102. Pulse 101 is a chirped pulse that self-focuses and self-compresses in the atmosphere as a result of dispersion wherein different frequencies travel with different velocities in air, and the Kerr effect, wherein the index of refraction of the optical medium increases upon the application of an electric field associated with an electromagnetic wave such as a laser beam. See A. Couairon and A. Mysyrowicz, "Femtosecond filamentation in transparent media," *Phys. Reports* 441, 47 (2007).

As illustrated in FIG. 1B, pulse 101 self-focuses and self-compresses as it travels through the atmosphere to form compressed laser pulse 103, and plasma filament 104 is formed in the atmosphere as compressed pulse 103 ionizes the air molecules along its path, with plasma filament 104 following the path of compressed pulse 103. The location in the atmosphere at which the plasma filament is formed can be precisely controlled by varying any one or more of the focal length, power, and frequency chirp of the ultrashort laser pulse. See P. Sprangle, J. R. Peñano, and B. Hafizi, "Propagation of Intense Short Laser Pulses in the Atmosphere," *Phys. Rev. E* 66, 046418 (2002) ("Sprangle 2002"). For example, compressed laser pulse 103 and plasma filament 104 can be generated from an ultrashort chirped pulse from a Ti:Sapphire laser with a focused intensity >10 TW/cm², and a bandwidth-limited pulse duration of ~50 fsec.

Thus, in accordance with the present invention, at time t1, USPL 102 can fire pulse 101 which is configured to travel through the atmosphere and form compressed laser pulse 103 and plasma filament 104 at a precise predetermined location in the atmosphere. Plasma filament 104 typically has a length on the order of about 1 m, a radius of about 100 µm, and an electron density of about $10^{16}$ cm$^{-3}$, and exists in the atmosphere for times on the order of tens of nanoseconds.

Figure 2A:
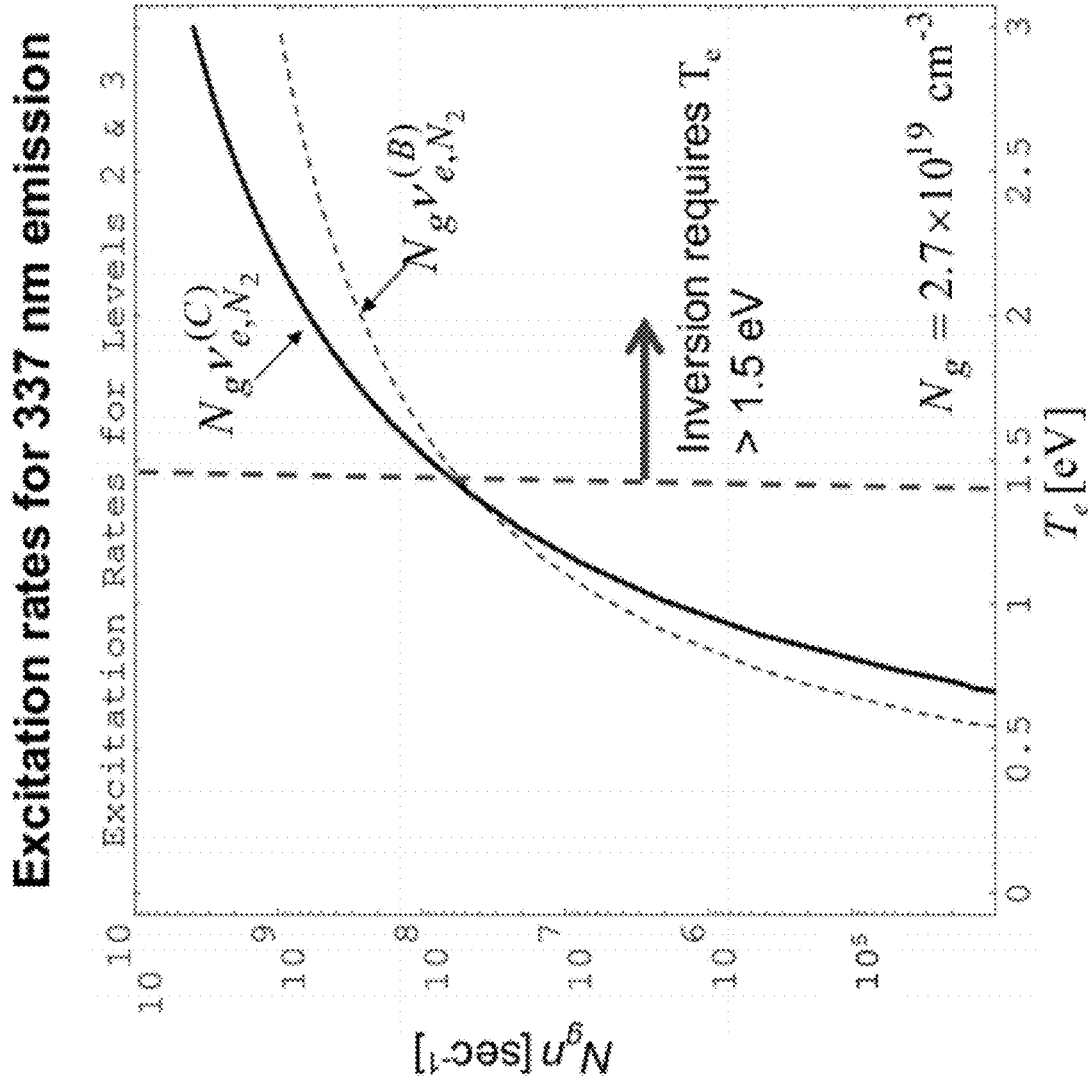
FIGS. 2A and 2B illustrate aspects of molecular excitation and population inversion relevant to some embodiments of the method of the present invention.
Figure 2B:
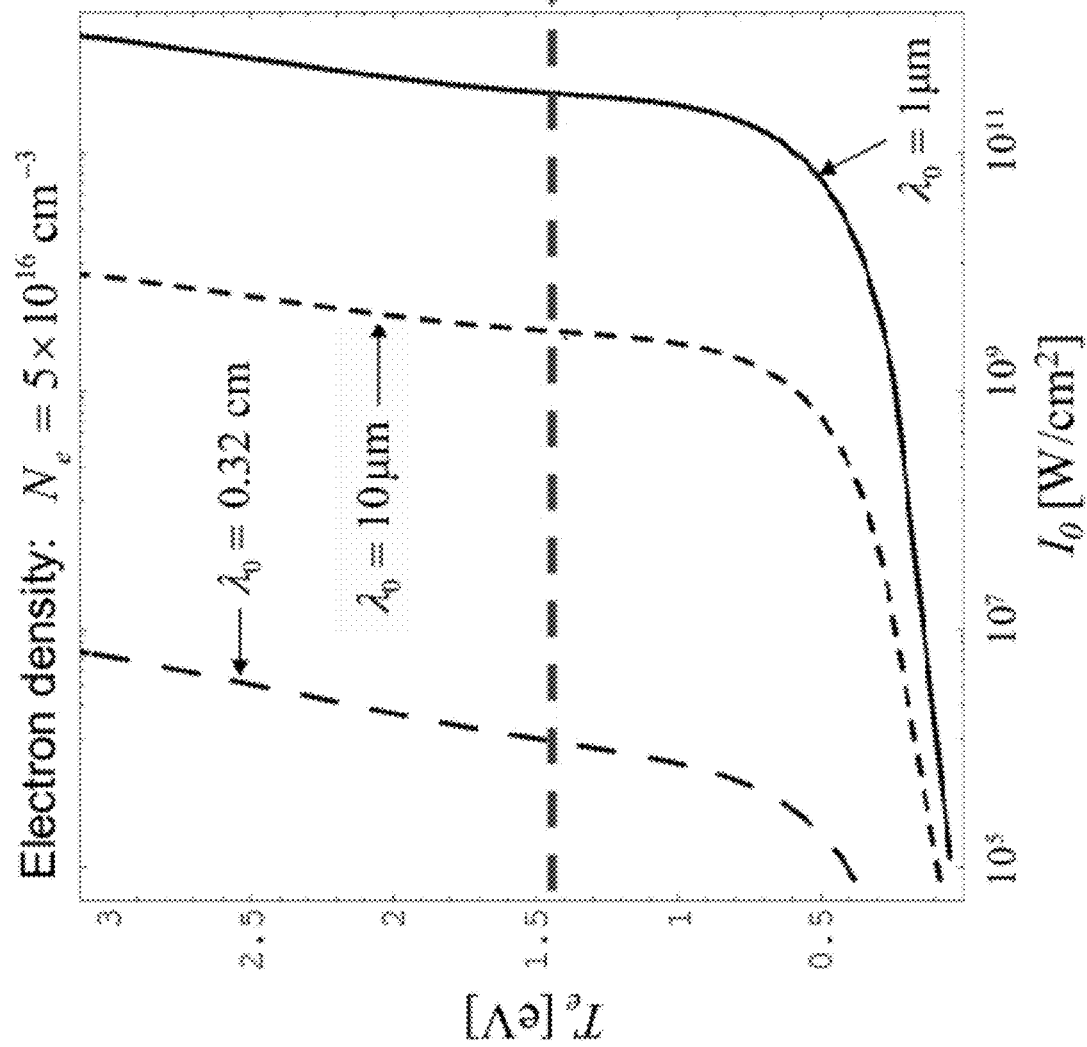

A very short time later, e.g., on the order of a few nanoseconds later, at time t2>t1, heater beam 105 is fired from Heater Beam Source 106, with heater beam 105 being directed and configured to impinge on plasma filament 104. Heater beam 105 can consist of a longer, higher energy laser pulse, e.g., an Nd:Yag or $CO_2$ laser pulse, or can be any other appropriate radiation beam that can propagate to the plasma filament to heat the electrons to a few eV. The heater beam intensity must be sufficiently large for thermal excitation to dominate the recombination excitation that occurs in the absence of the heater beam, e.g., >0.5 TW/cm² for a heater beam with a 1 µm wavelength. As described below, heater beam 105 thermally excites the free, or "seed," electrons which have been generated through the ionization of the air molecules as the filament forms in the atmosphere, and the excited electrons further collisionally excite the $O_2$ and $N_2$ molecules within the filament. Thermal electrons of a few eV can induce a population inversion of the $N_2$ molecules in the filament. Creating an inverted population depends on the excitation rates and relative lifetimes of the two levels. For example, as shown in FIG. 2A, a population inversion of $N_2$ can be generated by thermal electrons having an electron temperature $T_e$ more than 1.5 eV. As shown in FIG. 2B, the intensity of the heater beam needed to obtain such a temperature increases as the wavelength $\lambda_0$ of the heater beam decreases.

Figure 3B:
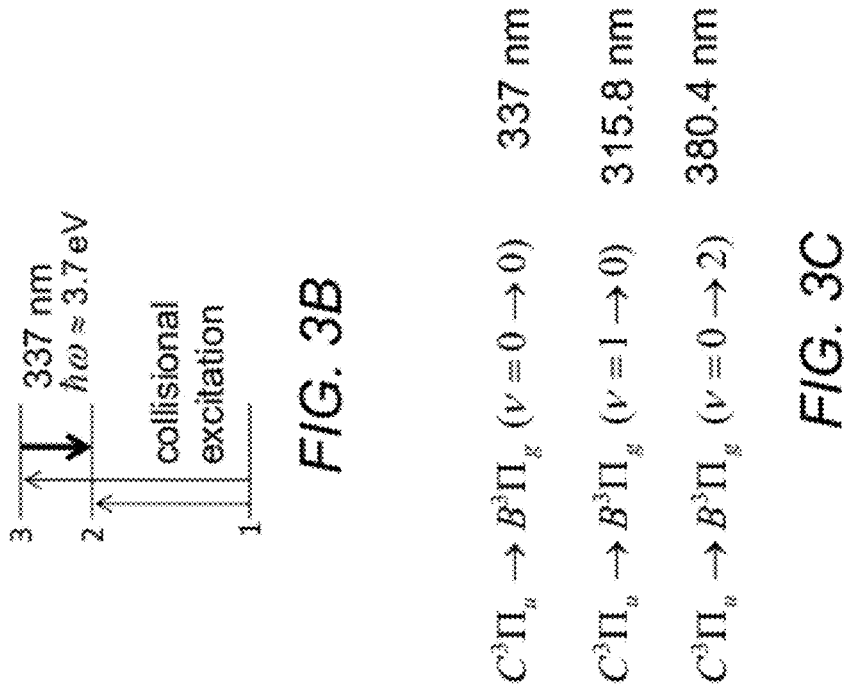
FIGS. 3A-3C illustrate aspects of energy transitions of $N_2$ relevant to some embodiments of the method of the present invention.
Figure 3C:
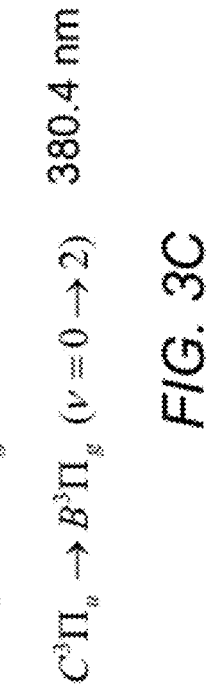
Figure 3A:
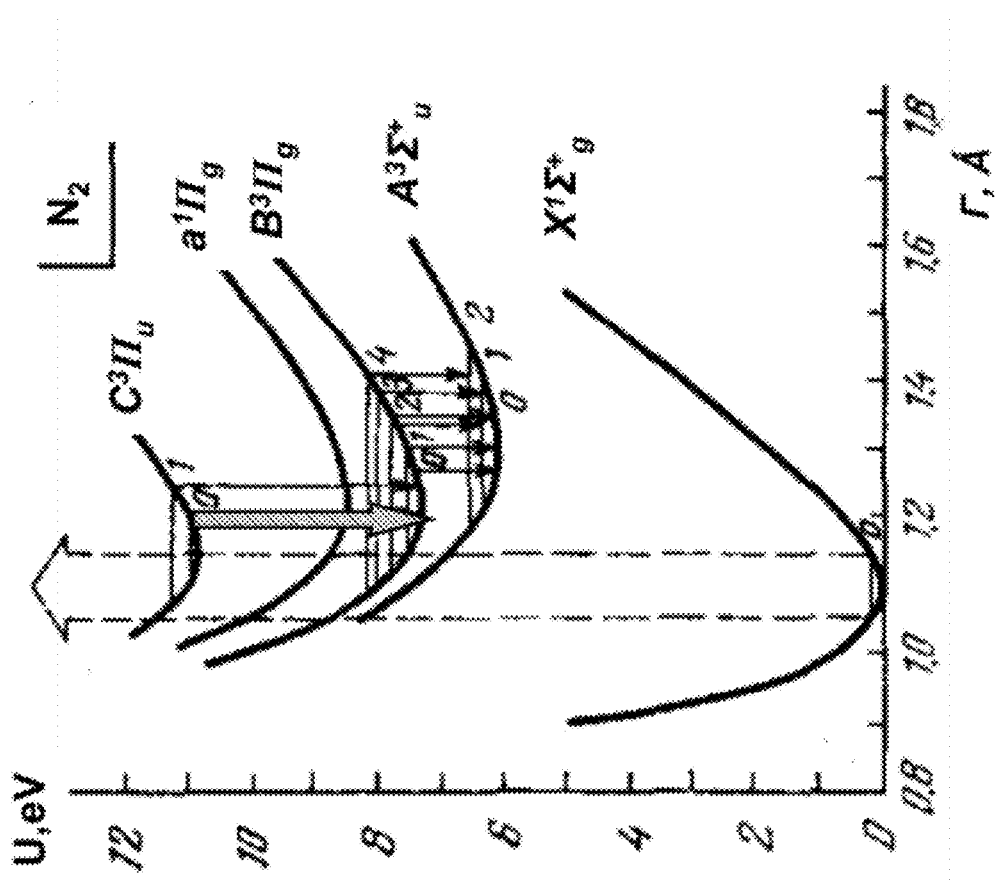

The excited $N_2$ molecules can then undergo a vibrational-electronic energy level transition, and as the excited molecule relaxes, it emits a photon and lases. For example, as illustrated in FIGS. 3A and 3B, the excited $N_2$ molecules can undergo the $C^3\Pi_u \to B^3\Pi_g(v=0\to0)$ transition of $N_2$, which causes output of laser pulse 107 at 337 nm. Other transitions also may be possible, as illustrated in FIG. 3C, such as the $C^3\Pi_u \to B^3\Pi_g(v=1\to0)$ transition which emits at 315.8 nm and the $C^3\Pi_u \to B^3\Pi_g(v=0\to2)$ transition which emits at 380.4 nm.

It should be noted that although FIG. 1A shows lasing in the forward direction, lasing generated in accordance with the present invention occurs in both forward and backward directions as long as $L>2L_{sat}$, where L is the length of the lasing region of the plasma filament and $L_{sat}$ is the saturation length.

It may be noted here that the presence of aerosols in the air would greatly reduce the required intensity on the heater field for collisional ionization. This is due to both field enhancement and the increase in collision frequency due to an increase in vapor pressure (vaporization) around the aerosol. Also, since the position of the plasma filament wanders transversely due to atmospheric turbulence, typically by a few centimeters over kilometer propagation distances, the spot size of the heater beam must be made larger than the wander to ensure overlap with the seed electrons in the filament. These and other mechanisms which contribute to atmospheric lasing in accordance with the present invention are described in more detail below.

Thus, in accordance with one exemplary embodiment of the present invention, an appropriately configured pulse from an USPL can form a plasma filament at a precise predetermined location in the atmosphere, the plasma filament containing free electrons which can then be thermally excited by a heater beam impinging on the filament to produce a population inversion and energy level transition of the $N_2$ and/or $O_2$ molecules in the filament and thus induce lasing with the atmosphere as the gain medium.

In accordance with another embodiment of the present invention, molecular nitrogen in air can be excited and lasing can be induced without the use of a heater beam by means of recombination processes within the plasma filament. Thus, in this embodiment as with the previous embodiment, a focused high-intensity pulse from a USPL is fired into the atmosphere. The pulse from the USPL is configured to generate a plasma filament at a predefined location in the atmosphere. The USPL pulse is further configured to excite the nitrogen molecules in the filament and produce an upper state populated by a three-body interaction of $N_2^+$, $N_2$, and $N_4^+$ in which the $N_4^+$ recombines with an electron to produce a nitrogen molecule:

$$N_2^+ + N_2 + N_2 \Rightarrow N_4^+ + N_2, \quad (1a)$$

$$N_4^+ + e \Rightarrow N_2^{(C)} + N_2 \quad (1b)$$

See H. L. Xu, A. Azarm, J. Bernhardt, Y. Kamali, S. L. Chin, "The mechanism of nitrogen fluorescence inside a femtosecond laser filament in air," Chem. Phys. 360, 171 (2009), the entirety of which is incorporated by reference in to the present disclosure.

The rate coefficients for the transitions in Equations (1a) and (1b) are

(see H. Bohringer and F. Arnold, "Temperature dependence of three-body association reactions from 45 to 400 K. The reactions $N_2^+ + 2N_2 \Rightarrow N_4^+ + N_2$ and $O_2^+ + 2O_2 \Rightarrow O_4^+ + O_2$", J. Chem. Phys. 77, 5534 (1982)) and

(see M. Fitaire, "Measurement of $N_4^+$ recombination rate vs. electron temperature in a proton beam created plasma," J. Chem. Phys. 81, 1753 (1984)), respectively. In addition, the $N_2^+$ and $N_4^+$ ions can undergo attachment and detachment, i.e., $N_2^+ + e \Rightarrow 2N$, $N_2 + O_2 \Rightarrow O_2^+ + N_2$, and $N_4^+ + O_2 \Rightarrow O_2^+ + 2N_2$, with rate coefficients $\beta_{e,N_2^+} = 4.3 \times 10^{-8} (T_e[eV])^{-0.4}$ cm$^3$/sec (see F. J. Mehr and M. A. Biondi, "Electron Temperature Dependence of Recombination of $O_2^+$ and $N_2^+$ Ions with Electrons," Phys. Rev. 181, 264 (1969)), $\beta_{O_2,N_2^+} = 2.7 \times 10^{-11} (T_g[eV])^{-0.8}$ cm$^3$/sec, and $\beta_{O_2,N_4^+} = 2.5 \times 10^{-10}$ cm$^3$/sec (see R. F. Fernsler, A. W. Ali, J. R. Greig and I. M. Vitkovitsky, "The NRL CHMAIR Code: A Disturbed Sea Level Air Chemistry Code," NRL Memorandum Report 4110 (1979)), respectively.

Figure 4:
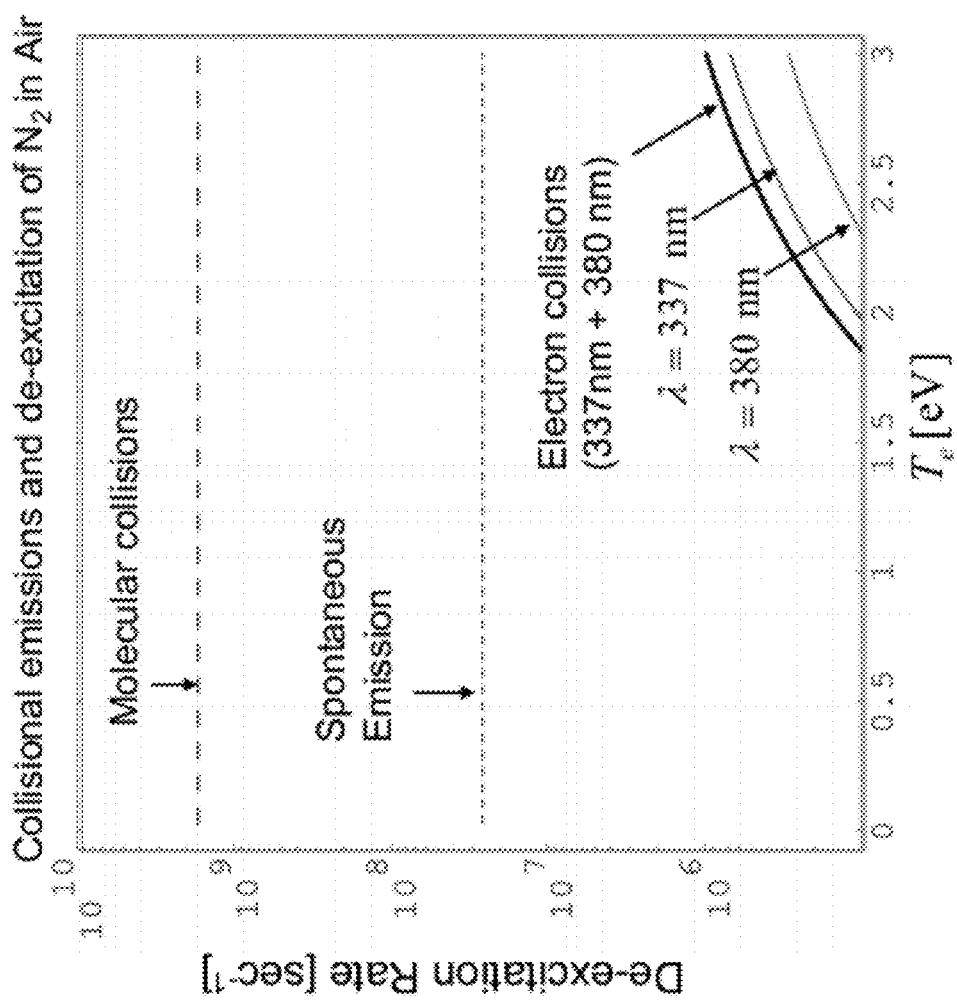
FIG. 4 is a plot illustrating aspects of collisional emissions and de-excitation of $N_2$ in air relevant to some embodiments of the method of the present invention.

The $N_2$ molecule that is produced by this mechanism is in the excited $C^3\Pi_u, v=0$ state. As illustrated in FIG. 4, the excited molecule then relaxes to a lower state as described above, to cause lasing at, e.g., 337 nm or 380 nm.

Thus, in accordance with this embodiment of the present invention, an appropriately configured USPL pulse can form a plasma filament at a precise predetermined location in the atmosphere, the plasma filament containing free electrons and nitrogen ions which recombine to produce an excited nitrogen molecule which lases when it relaxes to a lower state.

A brief description of the physical processes involved in the remote generation of lasing in the atmosphere in accordance with the present invention will now be presented. Additional details can be found in the paper by P. Sprangle, J. Peñano, B. Hafizi, D. Gordon, and M. Scully entitled "Remotely induced atmospheric lasing," Appl. Phys. Lett. 98, 211102 (2011) ("Sprangle 2011"), the entirety of which is hereby incorporated by reference into the present disclosure.

The atmospheric propagation of ultrashort pulse lasers (USPLs) having approximately TW power levels and pulse durations of about 100 fsec are strongly affected by various interrelated processes. These processes include diffraction, Kerr focusing, group velocity dispersion, spectral broadening, self phase modulation, photo-ionization, plasma defocusing, and pulse energy depletion. See Couairon, supra; see also P. Sprangle, J. R. Peñano, and B. Hafizi, "Propagation of Intense Short Laser Pulses in the Atmosphere," Phys. Rev. E 66, 046418 (2002) ("Sprangle 2002"), both of which are hereby incorporated by reference into the present disclosure in their entirety.

Thus, an intense laser pulse propagating in air can be longitudinally and transversely focused at remote distances greater than a kilometer to reach intensities sufficient to ionize the air. Longitudinal pulse compression is achieved by introducing a negative frequency chirp on the pulse, while nonlinear transverse focusing is caused by the Kerr effect. See Sprangle 2002, supra, and Couairon, supra. See also J. R. Peñano, P. Sprangle, B. Hafizi, A. Ting, D. F. Gordon, and C. A. Kapetanakos, "Propagation of ultra-short, intense laser pulses in air," Phys. Plasmas 11, 2865 (2004); and A. Ting, I. Alexeev, D. Gordon, E. Briscoe, J. Peñano, R. Fischer, R. Hubbard, P. Sprangle and G. Rubel, "Remote atmospheric breakdown for standoff detection by using an intense short laser pulse," Applied Optics, 44, 5315 (2005) both of which are hereby incorporated by reference into the present disclosure in their entirety. As a result of the longitudinal and transverse compression, the intensity of the laser pulse is enhanced, increasing to greater than about >10 TW/cm$^2$, resulting in ionization of the air molecules and formation of a plasma filament as the intense laser pulse passes through the atmosphere. Such a plasma filament typically has a length of about 1 m and a radius of about 100 μm, and has an electron density $N_e$ of about $10^{16}$ cm$^{-3}$. See Couairon, supra.

The $N_2$ lasing model used in the some embodiments of remote atmospheric lasing in accordance with the present invention consists of an open two level system denoted by levels 3 (upper) and 2 (lower) respectively. Since levels 3 and 2 are weakly excited the population of level 1 (ground) is taken to be fixed. The population of the excited levels are given by $$\frac{\partial N_3}{\partial \tau} = v_{CE,13}N + v_{CE,23}N_2 - v_3 N_3 - v_{stim}(N_3 - N_2) \quad (2a)$$

$$\frac{\partial N_2}{\partial \tau} = v_{CE,12}N + (v_{CD,32} + \Gamma_{32})N_3 - v_2 N_2 + v_{stim}(N_3 - N_2) \quad (2b)$$

where $\tau=t-z/c$ is the lifetime of an excited electron, z is the position of the excited electron within the filament, t is time, c is the speed of light, $N_n$ are densities of the $n^{th}$ level, $N \approx N_1 = 0.8 N_a$ is the ground state density, $N_a = 2.7 \times 10^{19}$ cm$^{-3}$ is the air density, $v_3 = v_{CD,31} + v_{CD,32} + \Gamma_{31} + \Gamma_{32}$ is the decay rate of level 3, $v_2 = v_{CD,21} + v_{CE,23} + \Gamma_{21}$ is the decay rate of level 2, $\Gamma_{ij}$ is the radiative (spontaneous) decay from level i to j, $v_{CE,ij}$ is the collisional excitation rate from level i to j, $v_{CD,ij}$ is the collisional de-excitation rate from level i to j (i, j=1, 2, 3), $v_{stim} = \sigma_{stim} I/\hbar\omega$ is the stimulated emission rate, I is the UV laser intensity, ω is the lasing frequency, $$\sigma_{stim} = \frac{(3\lambda^2/4\pi)\left(\frac{\Gamma_{32}}{\gamma_{23}}\right)\gamma_{23}^2}{(\Delta\omega_{32}^2 + \gamma_{23}^2)}$$

is the stimulated emission cross section, $$\Gamma_{32} = \frac{\left(\frac{4}{3}\right)\left(\frac{\omega}{c}\right)^3|\mu_{32}|^2}{\hbar},$$

$\mu_{32}$ is the dipole moment between levels 3 and 2, $$\gamma_{23} = \gamma_{23}^{(col)} + \left(\frac{1}{2}\right)(v_2 + v_3)$$

is the dipole decay rate, and $\gamma_{23}^{(col)}$ is the dipole dephasing rate due to collisions (no population transfer). The dephasing rate $\gamma_{23}^{(col)}$ is the dominant contribution to $\gamma_{23}$.

The lasing intensity produced by the remote atmospheric lasing method in accordance with the present invention is given by $$\left(\frac{\partial}{\partial z} + \Gamma_d\right)I = \frac{\varepsilon I_{stim}}{(c\tau_{rad,32})} + \sigma_{stim}\Delta N I \quad (3)$$

where $\Gamma_d$ is the spatial damping rate, ε is a geometric filling factor associated with the seed radiation within the plasma filament, $I_{stim} = \hbar\omega c N_3$, $\tau_{rad,32}$ is the radiative lifetime from level 3 to 2 including the effects of collisions, and $\Delta N + N_3 - N_2$.

Physical Processes Affecting Lasing

The overall lasing process of the method of the present invention is governed by a number of physical processes, including the atmospheric propagation of the USPL and the heater beam, air-plasma dynamics, and the excitation and de-excitation of the electro-vibrational states of the air molecules. These processes are described below. However, it should be noted that the description of these processes herein is for completeness only and is not in any way to be construed as limiting the scope of the invention described and claimed herein.

Atmospheric Propagation of the USPL and Heater Beams

As noted above, the USPL can be configured to generate a plasma filament at a precise location by varying one or more of the focal length, power, and frequency chirp of the pulse. However, it should also be noted that the propagation of both the USPL and heater beams is affected by the atmosphere. The atmosphere affects the focusing properties (spreading), transverse displacement (wander), and intensity of the two beams. When considering the propagation of the USPL, for which the pulse duration is sufficiently short that atmospheric turbulence can be considered stationary, it is therefore necessary to obtain the short-time wander and spreading characteristics of the pulse.

For longer duration heater pulses, or cw beams, it is the time averaged spot size and intensity that is relevant. The spot size of the heater beam must be sufficiently large that the beam overlaps with the plasma filament, while the intensity of the heater beam must be sufficiently large within the plasma filament to heat the electrons to ~2 eV.

In general, the long time averaged spot size of a laser beam at range L can be written as $R(L) = (\Theta_{spread}^2(L)L^2 + R_0^2(1-L/L_{focal})^2)^{1/2}$ where $R_0$ is the initial spot size and $L_{focal}$ is the focal length of the laser. The minimum laser beam spot size at a particular range is obtained by setting $L = L_{focal}$ and is given by $R = \Theta_{spread}L$, where the spreading angle $\Theta_{spread}$ contains contributions from diffraction, beam quality, atmospheric turbulence, mechanical jitter, and thermal blooming See P. Sprangle, A. Ting, J. Peñano, R. Fischer, B. Hafizi, "Incoherent Combining and Atmospheric Propagation of High-Power Fiber Lasers For Directed-Energy Applications," *IEEE Journal of Quantum Electronics* 45, 138 (2009); and R. L. Fante, "Electromagnetic beam propagation in turbulent media," *IEEE Proceedings*, vol., 63, pp. 1669, 1975.

For the purpose of simplifying the discussion the effects of jitter and thermal blooming are neglected since they are expected to be small compared to the effect of turbulence. For single-mode beams ($M^2=1$) propagating over long distances, contribution from atmospheric turbulence usually dominates diffractive and beam quality spreading. Propagation through atmospheric turbulence results in spreading of the laser spot size and wandering of the beam centroid.

Thus, under certain conditions, the spot size of the heater beam can be made such that it impinges on the plasma filament by adjusting its focal length and using appropriate optics.

In addition, as noted above, intensity of the heater beam must be sufficiently large within the plasma filament to heat the electrons to at least 1.5 eV. For example, the heater beam should have an intensity of >0.5 TW/cm$^2$ for a heater beam with a 1 μm wavelength (see FIG. 2B). This is readily achieved by focusing with a lens or utilizing nonlinear self-focusing for the case of a 1 μm wavelength heater pulse.

There are a number of different types of heater beams that can be used to thermalize the seed electrons remotely generated by the USPL. These include a millimeter wave source at 94 GHz with a wavelength $\lambda_0=0.32$ cm, a $CO_2$ laser ($\lambda_0=10.6$ μm), or an Nd:YAG laser ($\lambda_0$=1 μm). The 94 GHz heater beam has a high heating absorption coefficient and is in an atmospheric transmission window, but cannot be focused well as the shorter wavelength heater beams.

Figure 5:
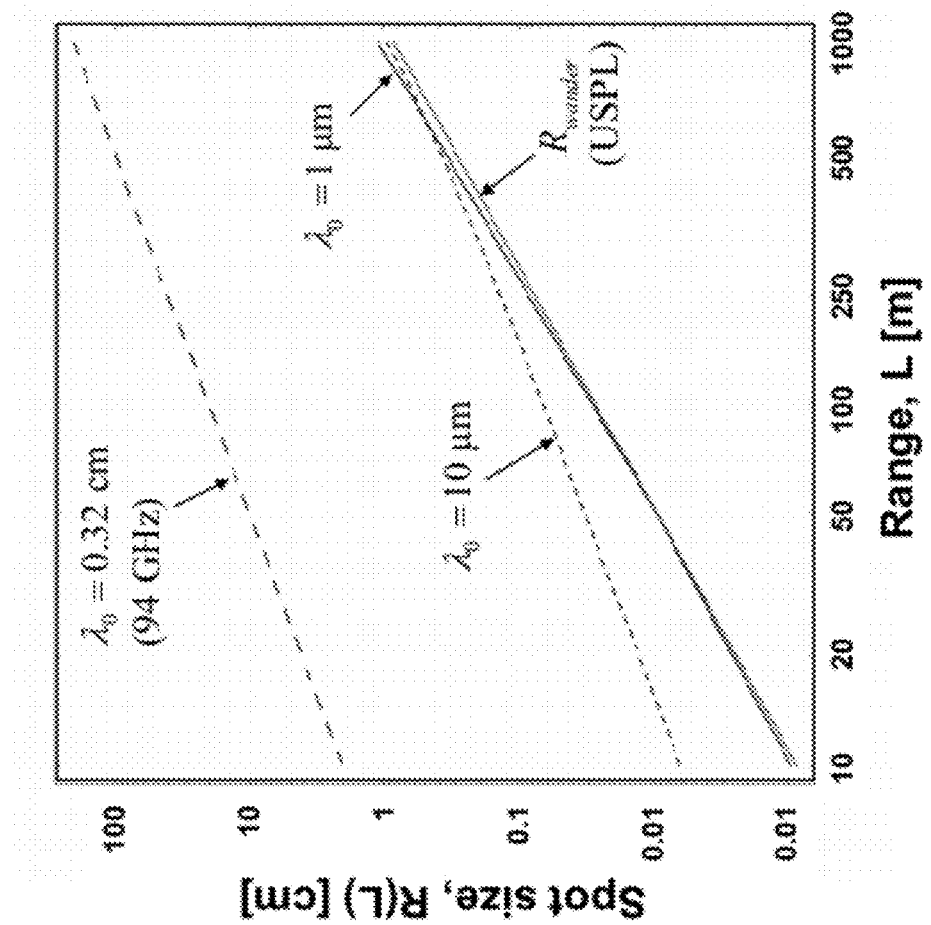
FIG. 5 is a plot illustrating the minimum spot size versus range of various heater beams propagating through atmospheric turbulence in accordance with the present invention.

FIG. 5 contains plots showing the minimum spot sizes of heater beams of various wavelengths as a function of propagation distance, as well as the rms wander distance ($R_{wander}$) of a USPL for comparison. Thus, as can be seen in FIG. 5, the rms wander of a focused USPL is typically ~1 cm at a range of 1 km for a moderate turbulence strength ($C_n^2$~$10^{14}$ m$^{-2/3}$) and an initial spot size of ~5 cm. As noted above, in addition to having sufficient intensity to heat the plasma filament, the heater beam should have a spot size larger than the wander distance of the USPL to achieve good overlap of the two beams. FIG. 5 plots the minimum spot sizes of three different heater beams at $\lambda_0$=0.32 cm, $\lambda_0$=1 μm, and $\lambda_0$=10 μm, respectively, as a function of range. FIG. 5 also shows a plot of $R_{wander}$ (USPL), for comparison.

The heating of the electrons in the plasma filament generated by the USPL is described by equations for the electron energy density and the vibrational temperature of the air molecules. It is assumed that the primary cooling mechanism of the electrons is the excitation of vibrational modes in $N_2$ and $O_2$ by inelastic collisions. At low energies one of the dominant inelastic cooling processes in air is the excitation of vibrational states of $N_2$. In addition, the cooling rate includes ionization cooling which is essentially the ionization rate times the ionization energy. The cooling rate is a function of electron temperature and is obtained from the CHMAIR code. See, e.g., A. W. Ali, "Electron Energy Loss Rates in Air," NRL Memorandum Report 5400 (1984); and R. F. Fernsler, A. W. Ali, J. R. Greig and I. M. Vitkovitsky, "The NRL CHMAIR Code: A Disturbed Sea Level Air Chemistry Code," NRL Memorandum Report 4110 (1979), both of which are hereby incorporated by reference into the present disclosure in their entirety. The relaxation time for the translational temperature to reach equilibrium with the electron translational temperature is ~(M/m)$\tau_{en}$~200 nsec), where M is the molecular mass and $\tau_{en}$ is the electron-molecule collision time. Therefore, for the time scales of interest in this discussion, we can neglect the translational heating of the molecules. The electron collision frequency used in the heating model includes electron-neutral and electron-ion contributions.

The electron and negative ion densities are described by coupled rate equations that include collisional ionization of $N_2$ and $O_2$, and electron attachment and recombination processes. The steady state electron density is given by $N_e$=($v_{ion}$-$\eta$)/$\beta$, where $v_{ion}$, $\eta$, and $\beta$ are the collisional ionization rate, attachment rate, and recombination coefficient, respectively. These quantities are taken to be dependent on the electron temperature. Typical values of the various parameters for air at STP are $\beta$~3×10$^{-8}$ cm$^3$ sec$^{-1}$, $\beta_{-+}$~2×10$^{-6}$ cm$^3$ sec$^{-1}$, and $\eta$~10$^8$ sec$^{-1}$. See Ali, supra; and Fernsler, supra.

The steady-state electron density increases dramatically with electron temperature. For the parameters used in the model, the DC breakdown field is ~27 kV/cm.

Lasing and Saturation

The lasing of various atmospheric molecules can be described using an open two-level system. This aspect of the present invention is discussed herein in the context of the $C^3\Pi_u \to B^3\Pi_g$(v=0→0) transition of molecular nitrogen, although as noted above other transitions, e.g., in $O_2$, can also be excited using the method of the present invention. The $N_2$ lasing process is described by the Maxwell-Bloch equations for an open two-level system, together with the electron heating and ionization equations. The primary excitation mechanism is electron collisions and not molecular collisions. The temperature dependent collisional excitation rates from the ground to the lower state, and the ground to the upper state are calculated using cross section data from Tatsuo Tabata, Toshizo Shirai, Masao Sataka, and Hirotaka Kubo, "Analytic cross sections for electron impact collisions with nitrogen molecules," *Atom. Dat. Nucl. Tab.* 92, 3 (2006), which is well known in the art. In calculating these excitation rates, a stationary Maxwellian electron distribution is assumed.

The lifetimes of the upper and lower levels include contributions due to spontaneous emission, molecular collisions (pressure), and electron collisions. The spontaneous lifetimes and pressure-dependencies of the lifetimes were obtained from F. Valk, M. Aints, P. Paris, T. Plank, J. Maksimov, and A. Tamm, "Measurement of collisional quenching rate of nitrogen states $N_2(C^3\Pi_u$,v=0) and $N_2^+(B^2\Sigma_g^+$,v=0)," *J. Phys. D* 43 385202 (2010); and H. Umemoto, "Selective production and kinetic analysis of thermally equilibrated $N_2(B^3\Pi_g$,v=0) and $N_2(W^3\Delta_u$,v=0), *Phys. Chem. Chem. Phys.* 5, 5392 (2003).

Assuming steady state conditions for the plasma density and temperature, a steady state population inversion can exist in principle if $$\frac{v_U}{v_L} > (T_L/T_U)\left[1 - \left(\frac{T_L}{T_{UL}}\right)\right]^{-1} \quad (3)$$

where $v_U$ and $v_L$ are the excitation rates of the upper and lower levels U and L, $T_U$ and $T_L$ are the lifetimes of the upper and lower levels, respectively, and $T_{UL}$ is the radiative decay time from the upper to the lower state associated with lasing at 337 run. At STP, $T_U \approx T_L$=0.6 n sec and $T_L$=7 n sec for an electron temperature of 2 eV.

When Equation (3) above is satisfied, and when the UV photon density is small, i.e., $$\sigma_s c N_{ph}\left[T_U + T_L\left(1 - \left(\frac{T_U}{T_{UL}}\right)\right)\right] \ll 1,$$

where $\sigma_s$=10$^{15}$ cm$^2$ is the cross section for stimulated emission, and $N_{ph}$ is the photon density at 337 nm, the UV radiation intensity grows exponentially in the distance z along the filament. The gain rate of such UV lasing can be expressed as $$\Gamma_{SS} = \sigma_S v_L N_g N_e T_u \left[\frac{\left(1 - \left(\frac{T_L}{T_{UL}}\right)\right)v_U}{v_L - \left(\frac{T_L}{T_U}\right)}\right],$$

where $N_g$ is the density of nitrogen molecules in the ground state, $N_e$ is the density of electrons in the excited state, and $\sigma_S$, $v_L$, $v_U$, $T_L$, $T_U$, and $T_{UL}$ are as described above.

The intensity of the lasing radiation at 337 nm is $I_{UV}$= $\hbar \omega c N_{ph}$, where $\hbar \omega$=3.68 eV and $\hbar \omega c$=1.77×10$^{-8}$ W cm. The intensity of the lasing radiation increases exponentially until it reaches the saturation point, i.e., until $I_{UV}$~$I_{sat}$, where $I_{sat}$=$\hbar \omega/(\sigma_S T_U)$. After that point, for $I_{UV}$>$I_{sat}$ the UV radiation grows linearly in z, i.e. $I_{UV}$~$I_{sat}\Gamma_{SS}z$.

The saturation length, i.e., the propagation distance at which $I_{UV}$~$I_{sat}$, is given by $$L_{sat} = \Gamma_{SS}^{-1}\left[1 + \ln\left(\frac{I_{sat}}{I_{UV,0}}\right)\right], \text{ where}$$

$$I_{UV,0} = \frac{\hbar\omega\varepsilon N_g N_e \nu_U T_U}{(T_{UL}\Gamma_{SS})}.$$

However, Equation (3) above is not satisfied in air at atmospheric pressure. For air at atmospheric pressure, lasing occurs as a transient (pulsed) process rather than as continuous emission. Solving the time dependent population equations under the assumption that the upper levels are initially unpopulated, a population inversion, can exist for short times $0<\tau<\tau_{UV}$, where $$\tau_{UV} = \frac{2T_U\left[1 - \left(\frac{\nu_L}{\nu_U}\right)\right]}{1 + \left(\frac{T_U}{T_{UL}}\right) - \left(\frac{\nu_L T_U}{\nu_U T_L}\right)} \quad (4)$$

which is typically ~0.5 nsec.

The peak gain rate occurs at time $\sim\tau_{UV}/2$ and has the value $$\Gamma_0 = \sigma_S \nu_L N_e N_g T_L \frac{\left(\left(\frac{\nu_U}{\nu_L}\right) - 1\right)^2}{2\left[\left(\frac{\nu_U}{\nu_L}\right)\left(\frac{T_L}{T_U}\right)\left(\frac{T_U}{T_L} + 1\right) - 1\right]}. \quad (5)$$

In the small signal regime, $N_{ph} \ll N_{ph,sat}$, where $$N_{ph,sat} = \frac{\nu_U N_e N_g \left(1 - \frac{\nu_L}{\nu_U}\right)}{(4\Gamma_0 c)}.$$

Figures 6A, 6B:
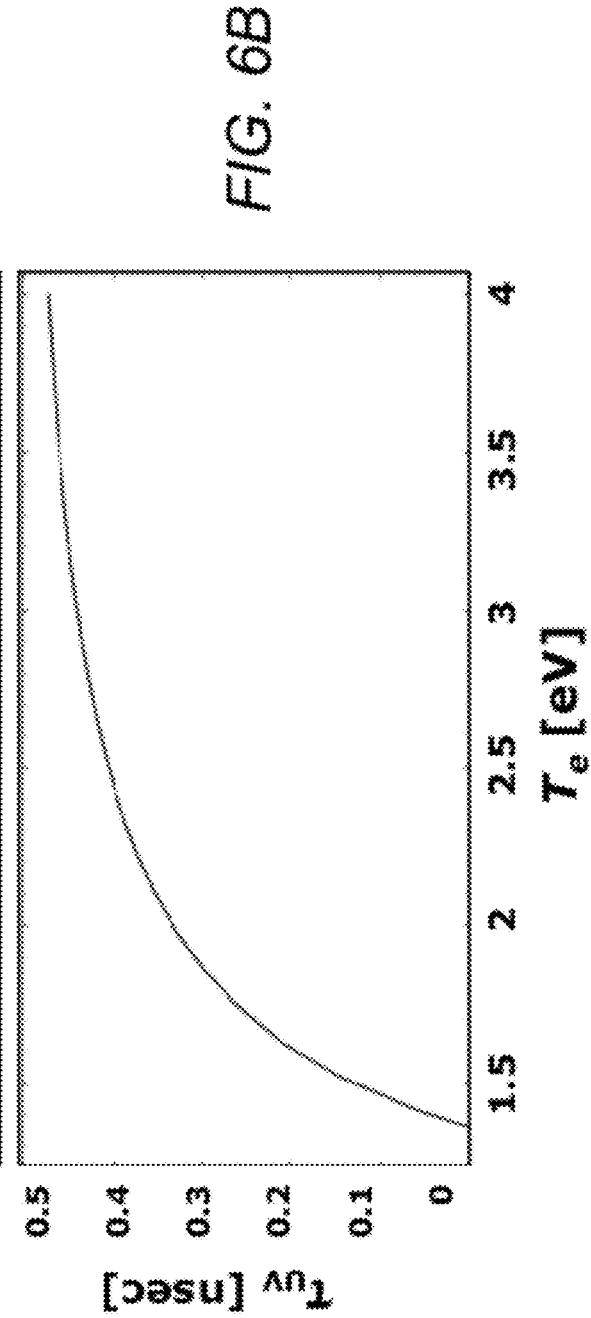
FIGS. 6A and 6B are plots illustrating gain length (FIG. 6A) and UV pulse duration (FIG. 6B) as a function of electron temperature.

FIGS. 6A and 6B are plots showing the UV pulse duration and gain length, respectively, as a function of electron temperature. For the assumed parameters, the typical gain length is ~3 cm and the UV pulse duration is ~0.35 nsec when the electron temperature is ~2 eV.

The photon density increases exponentially, i.e., $N_{ph} \approx N_{ph,0}\exp(\Gamma_0 z)$, until $N_{ph} \sim N_{ph,sat}$. In the saturation regime where the photon density becomes large, i.e., $$N_{ph} \gg \frac{\nu_U N_e N_g \left(1 - \frac{\nu_L}{\nu_U}\right)}{(4\Gamma_0 c)},$$

the photon density grows linearly, $$N_{ph} \approx N_{ph,sat} + \frac{N_e N_g (\nu_U - \nu_L) z}{4c}.$$

See Sprangle 2011, supra; see also J. Peñano, P. Sprangle, B. Hafizi, D. Gordon, R. Fernsler, and M. Scully, "Remote Lasing in Air by Recombination and Electron Impact Excitation of Molecular Nitrogen," to appear in Journal of Applied Optics (January 2012).

Atmospheric UV Lasing Examples

We consider the case of a UV lasing in a moderately turbulent atmosphere with $C_n^2 = 10^{-14}$ m$^{-2/3}$. The heater pulse has a wavelength of 1 μm (Nd:YAG), an energy of ~2 J, and a pulse duration of 1 nsec. For lasing at 100 m range, the heater pulse is focused to a spot size of ~0.04 cm to generate a peak intensity of 0.7 TW/cm$^2$. The resulting UV lasing is plotted in FIGS. 7 and 8A-8B.

Figure 7:
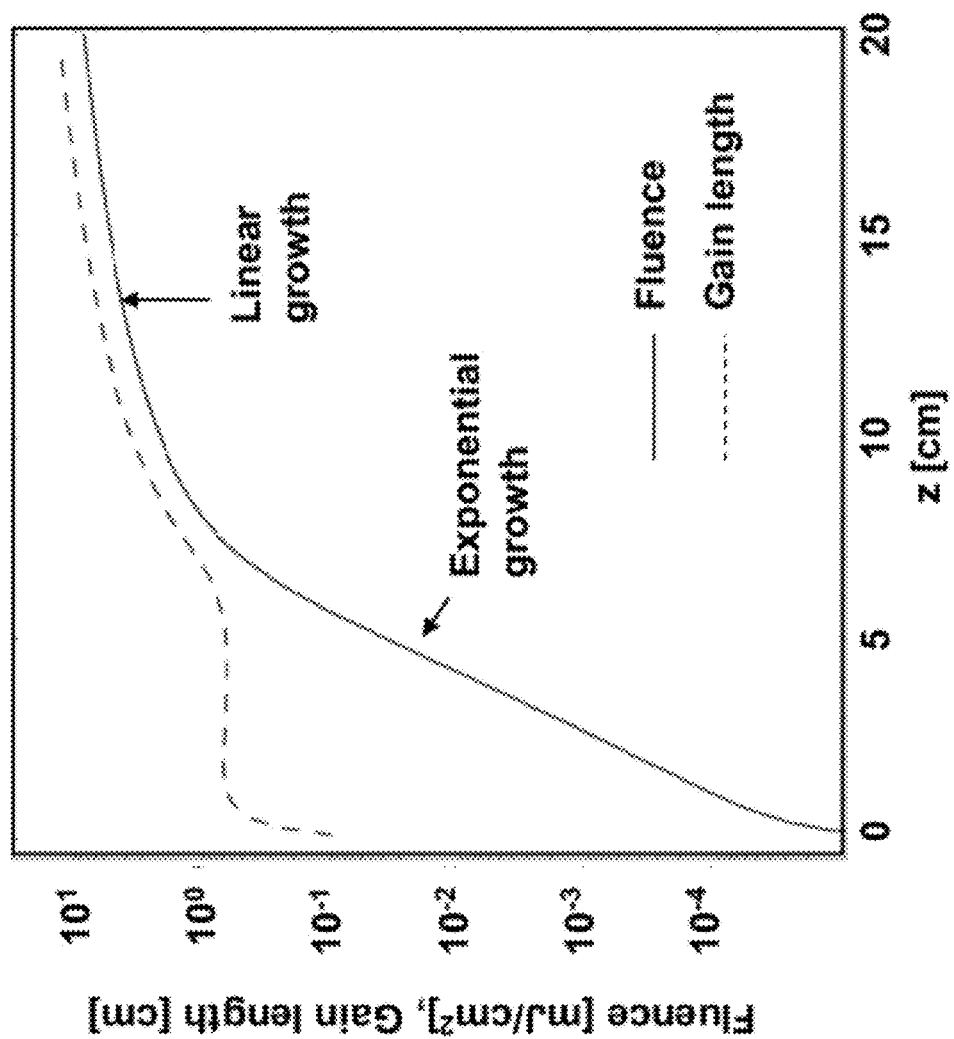
FIG. 7 contains plots illustrating UV fluence (solid curve) and local gain length (dashed curve) as a function of propagation distance within a plasma filament.

FIG. 7 plots the UV fluence and gain length as a function of position. Here, z=0 denotes the position of the onset of lasing, i.e., 100 m from the USPL source. There is exponential growth of the UV fluence for z<7 cm, after which the growth of the UV fluence becomes linear in z. The fluence at the onset of linear growth is ~1 mJ/cm$^2$. FIG. 5a shows the corresponding temporal profiles of the UV intensity, normalized inversion density $\Delta N = N_U - N_L$, and heater pulse intensity at z=12 cm, in the linear growth regime. The UV pulse length (~0.2 nsec) is much shorter than the heating pulse and the peak UV intensity is ~27 MW/cm$^2$. The inversion density profile exhibits depletion in the region where the UV amplitude is large.

Figure 8A:
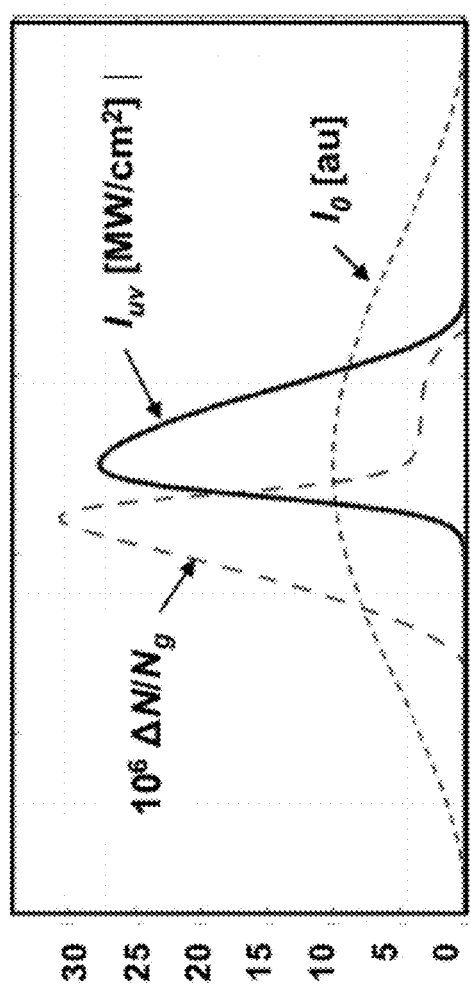
Figure 8B:
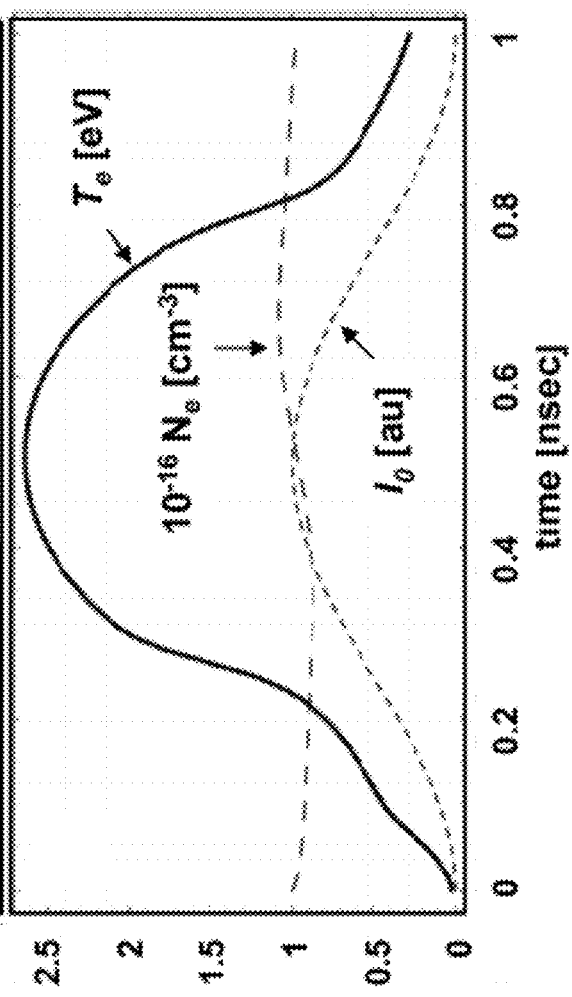

FIG. 8A plots temporal profiles of UV intensity, normalized inversion density, and heater beam intensity of the resultant beam, while FIG. 8B plots the corresponding profiles of plasma density and temperature at z=12 cm. As can be seen from the plots in FIGS. 8A and 8B, the plasma density is relatively constant while the electron temperature varies on the time scale of the heating pulse and has a peak value of ~2.5 eV.

Advantages and New Features

Standoff detection methods of biological and chemical agents using UV fluorescence requires that the UV source be close to the interrogation region since UV radiation is strongly absorbed in the atmosphere. The remote atmospheric lasing configuration described in this disclosure provides a way to generate a UV source at ranges of up to several kilometers. The gain rate of the lasing process is ~1 cm$^{-1}$, so that for plasma filaments of length ~10 cm, the lasing process can saturate in a single pass.

The lasing method described herein has several new features:

The method for remote atmospheric lasing in accordance with the present invention fundamentally differs from previously considered methods, which utilize multi-photon ionization of oxygen and swept-gain superradiance. See Kocharovsky, supra; see also A. Dogariu, J. B. Michael, M. O, Scully, R. B. Miles, "High Gain Backward Lasing in Air," *Science* 331, 442 (2011).

First, the method of the present invention does not rely on the simultaneous action of two picosecond laser pulses with a frequency sum or difference that is resonant with a ground-to-vibrational transition, as does the method of Dogariu. Instead, atmospheric lasing in accordance with the present invention is based on collisional excitation of the various molecular constituents of air, e.g., $N_2$ and $O_2$.

Second, the secondary laser pulses in our method are used to heat the plasma, not as a means to amplify in a preferred direction as in the method of Kocharovsky.

Third, the method of the present invention can be used to excite more than one of the electronic and vibrational states of various air molecules, leading to multiple lasing lines. None of the previous methods for remote atmospheric lasing can do this.

Alternatives

Although particular embodiments, aspects, and features have been described and illustrated, it should be noted that the invention described herein is not limited to only those embodiments, aspects, and features, and it should be readily appreciated that modifications may be made by persons skilled in the art.

For example, at least the following various alternative configurations are possible:

The USPL can be combined with its third harmonic to provide a seed for the UV lasing.

If the spot size of the heater beam is sufficiently large near the region of interest, multiple plasma filaments can be formed side by side to increase the UV power. This can be done by either rastering the USPL or using a single ultrashort pulse laser with a power greater than the nonlinear focusing power of air. The latter method would cause the pulse to break up into multiple filaments.

The presence of aerosols, negative ions, or other easily ionized matter can be exploited to produce seed electrons without a USPL. In this case, the heater beam can produce seed electrons by ionizing the aerosols or negative ions.

In addition, for standoff detection of biological and chemical agents by fluorescence, which is emitted over $4\pi$ srad, the receiver configuration can be either mono-static or multi-static. For a 1 μm wavelength heater beam the Kerr nonlinearity in air can be the source of third harmonic generation which could be a seed for forward lasing at 337 nm.

The present application contemplates these and any and all other modifications within the spirit and scope of the underlying invention described and claimed herein, and all such embodiments are within the scope and spirit of the present disclosure.

What is claimed is:

1. A method for remotely generating a laser pulse in the atmosphere, comprising:
    at time t1, firing a first laser pulse into the atmosphere, the first laser pulse being a pulse from an ultrashort pulse laser (USPL) and being configured to generate a plasma filament at a predetermined location in the atmosphere through ionization of $O_2$ and $N_2$ molecules in the atmosphere, the plasma filament containing a plurality of free electrons generated as a result of the ionization; and
    at time t2>t1, firing a second laser pulse into the atmosphere, the second laser pulse being an intense pulse and being configured to form a heater beam that overlaps at least part of the plasma filament so as to thermalize at least some of the free electrons in the plasma filament;
    wherein the thermalized electrons collide with other electrons and the $O_2$ and $N_2$ molecules in the filament to collisionally excite a plurality of $N_2$ molecules in the filament, create a population inversion of excited $N_2$ molecules and cause lasing, the lasing being the result of the $C^3\Pi_u \to B^3\Pi_g (v=0 \to 0)$ transition of the $N_2$ in the filament.

2. The method according to claim 1, wherein the first laser pulse and the second laser pulse are configured to cause lasing in the UV wavelength range.

3. The method according to claim 1, wherein the first laser pulse and the second laser pulse are configured to cause lasing at 337 nm.

4. The method according to claim 1, wherein the first pulse is a negatively chirped laser pulse.

5. The method according to claim 1, wherein the first pulse is configured to generate the free electrons by multi-photon ionization of the air molecules in the filament.

6. The method according to claim 1, wherein the first pulse is configured to generate the free electrons by tunneling ionization of the air molecules in the filament.

7. The method according to claim 1, wherein the first and second laser pulses are configured to excite more than one of the electronic and vibrational states of the $O_2$ and $N_2$ molecules in the filament so as to form a plurality of lasing lines, at least one of the plurality of lasing lines lasing at a wavelength different from another of the plurality of lasing lines.

8. A method for remotely generating a laser pulse in the atmosphere, comprising:
    firing a laser pulse from an ultrashort pulse laser (USPL) into the atmosphere, laser pulse being configured to generate a plasma filament at a predetermined location in the atmosphere, the plasma filament containing nitrogen molecules and a plurality of free electrons, the laser pulse being further configured to excite the nitrogen molecules in the plasma filament to produce an upper state populated a plurality of $N_2^+$ and $N_2$ molecules;
    wherein the $N_2^+$ and $N_2$ molecules undergo a three-body interaction to generate $N_4^+$, which then recombines with an electron to produce an inversion of $N_2$ molecules in the excited $C^3\Pi_u$ state; and
    wherein the excited $N_2$ molecules undergo a $C^3\Pi_u \to B^3\Pi_g$ (v=0→0) transition of the $N_2$ in the atmosphere to lase at 337 nm.

9. The method according to claim 8, wherein the laser pulse is configured to cause lasing in the UV wavelength range.

10. The method according to claim 8, wherein the laser pulse is configured to cause lasing at 337 nm.

11. The method according to claim 8, wherein the laser pulse is a negatively chirped laser pulse.

12. The method according to claim 8, wherein the laser pulse is configured to generate the free electrons by multi-photon ionization of the air molecules in the filament.

13. The method according to claim 8, wherein the laser pulse is configured to generate the free electrons by tunneling ionization of the air molecules in the filament.

14. The method according to claim 8, wherein the laser pulse is configured to excite more than one of the electronic and vibrational states of the $O_2$ and $N_2$ molecules in the filament so as to form a plurality of lasing lines, at least one of the plurality of lasing lines lasing at a wavelength different from another of the plurality of lasing lines.

* * * * *